(12) United States Patent
Maguin et al.

(10) Patent No.: US 9,169,760 B2
(45) Date of Patent: Oct. 27, 2015

(54) CONVEYING UNIT FOR CONVEYING REDUCING AGENT

(71) Applicant: EMITEC GESELLSCHAFT FUER EMISSIONSTECHNOLOGIE MBH, Lohmar (DE)

(72) Inventors: Georges Maguin, Ars Laquenexy (FR); Loic Badoual, Malzeville (FR)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 256 days.

(21) Appl. No.: 13/963,474

(22) Filed: Aug. 9, 2013

(65) Prior Publication Data
US 2013/0319550 A1    Dec. 5, 2013

Related U.S. Application Data

(63) Continuation of application No. PCT/EP2012/051807, filed on Feb. 2, 2012.

(30) Foreign Application Priority Data

Feb. 9, 2011    (DE) .......................... 10 2011 010 640

(51) Int. Cl.
*F01N 3/04*    (2006.01)
*F01N 3/20*    (2006.01)

(52) U.S. Cl.
CPC .............. *F01N 3/208* (2013.01); *F01N 3/2066* (2013.01); *F01N 3/206* (2013.01); *F01N 2610/02* (2013.01);
(Continued)

(58) Field of Classification Search
CPC ................ F01N 3/206; F01N 2610/02; F01N 2610/1426; F01N 2610/1433; F01N 2610/1466; F01N 2610/148; F01N 2610/1493; F01N 2900/1808; F01N 2900/1811
USPC ............................ 60/286, 287, 295, 301, 320
See application file for complete search history.

(56) References Cited

U.S. PATENT DOCUMENTS 8,359,831 B2    1/2013    Chmielewski et al.
8,464,966 B2    6/2013    Haeberer et al.
(Continued)

FOREIGN PATENT DOCUMENTS

CN    201159124 Y    12/2008
CN    101584260 A    11/2009
(Continued)

OTHER PUBLICATIONS

International Search Report of PCT/EP2012/051807, Dated May 4, 2012.

*Primary Examiner* — Thomas Denion
*Assistant Examiner* — Jorge Leon, Jr.
(74) *Attorney, Agent, or Firm* — Laurence A. Greenberg; Werner H. Stemer; Ralph E. Locher (57) ABSTRACT

A conveying unit for conveying reducing agent from a tank to an exhaust gas treatment device for cleaning the exhaust gases from an internal combustion engine, includes a flange defined at least by a first side and a second side. The first side and the second side are disposed so as to be mutually opposed, at least in part. At least a filter, a biased ice pressure compensator and/or a flexible ice pressure compensator are disposed on the first side. At least a pump, a pressure sensor and/or a temperature sensor are disposed on the second side.

4 Claims, 7 Drawing Sheets (52) U.S. Cl.
CPC ... *F01N 2610/148* (2013.01); *F01N 2610/1426* (2013.01); *F01N 2610/1433* (2013.01); *F01N 2610/1466* (2013.01); *F01N 2610/1486* (2013.01); *F01N 2610/1493* (2013.01); *F01N 2900/1808* (2013.01); *F01N 2900/1811* (2013.01); *Y02T 10/24* (2013.01); *Y10T 137/794* (2015.04)

(56) References Cited

U.S. PATENT DOCUMENTS

| | | | |
|---|---|---|---|
| 2005/0069468 A1* | 3/2005 | Huber et al. | 422/172 |
| 2009/0084736 A1* | 4/2009 | Rocheux et al. | 210/774 |
| 2009/0199538 A1* | 8/2009 | Boe et al. | 60/274 |
| 2009/0229258 A1* | 9/2009 | Zapf et al. | 60/295 |
| 2009/0230136 A1 | 9/2009 | Dougnier et al. | |
| 2010/0223917 A1* | 9/2010 | Kolberg et al. | 60/295 |
| 2011/0113765 A1 | 5/2011 | Brück et al. | |
| 2011/0192151 A1 | 8/2011 | Overhoff et al. | |
| 2011/0194987 A1* | 8/2011 | Hodgson et al. | 422/187 |
| 2012/0181261 A1 | 7/2012 | Brück et al. | |

FOREIGN PATENT DOCUMENTS

| | | |
|---|---|---|
| DE | 102006061736 A1 | 7/2008 |
| DE | 102008045958 A1 | 3/2010 |
| DE | 102009041179 A1 | 3/2011 |
| DE | 102010007564 A1 | 8/2011 |
| EP | 1553270 A1 | 7/2005 |
| EP | 1925354 A1 | 5/2008 |
| EP | 2182190 A2 | 5/2010 |
| EP | 2273860 A1 | 1/2011 |
| FR | 2915185 A1 | 10/2008 |
| JP | 4142756 B2 | 9/2008 |
| JP | 2010513813 A | 4/2010 |
| KR | 10089424 B1 | 4/2009 |
| KR | 20100048949 A | 5/2010 |
| WO | 2009135768 A1 | 11/2009 |

* cited by examiner

CONVEYING UNIT FOR CONVEYING REDUCING AGENT

CROSS-REFERENCE TO RELATED APPLICATION

This is a continuation application, under 35 U.S.C. §120, of copending International Application No. PCT/EP2012/051807, filed Feb. 2, 2012, which designated the United States; this application also claims the priority, under 35 U.S.C. §119, of German Patent Application DE 10 2011 010 640.5, filed Feb. 9, 2011; the prior applications are herewith incorporated by reference in their entirety.

BACKGROUND OF THE INVENTION

Field of the Invention

The invention relates to a conveying unit for conveying reducing agent from a tank to an exhaust gas treatment device which is adapted to clean the exhaust gases from an internal combustion engine.

Exhaust gas treatment processes in which a reducing agent is fed to the exhaust gas have been used increasingly in recent years. In particular, the process of selective catalytic reduction (SCR process) has often been employed until now. With that process nitrogen oxide compounds in the exhaust gas are reduced with the aid of a reducing agent. For example, the process is used to clean the exhaust gases from motor vehicles, and in particular from commercial vehicles. For that purpose, ammonia in particular is used as a reducing agent. The reducing agent is often added not directly to the exhaust gas, but in the form of a reducing agent precursor which reacts in the exhaust gas to form the actual reducing agent. Urea-water solution is a reducing agent precursor which is often used for ammonia. A urea-water solution with a urea content of 32.5% is widely available under the trademark AdBlue®. For the sake of simplicity, the term "reducing agent" will also be used hereinafter for reducing agent precursor and reducing agent precursor solutions.

In the case of a conveying unit for reducing agent, it should be ensured that the supply of reducing agent is as reliable and as precisely metered as possible so that as far as possible the precise amount of reducing agent required to reduce the nitrogen oxide compounds which are present is supplied to the exhaust gas. A problem arises in that aqueous reducing agents may freeze when used at low temperatures. For example, the above-described 32.5% urea-water solution freezes at temperatures of −11° C. Such temperatures can easily occur, in particular in exhaust gas treatment devices in motor vehicles, for example during idle periods in winter. In that context, the term "freeze" describes the phase transition of the reducing agent from liquid to solid. When a reducing agent freezes, the volume increases if the reducing agent is an aqueous reducing agent. In the case of a conveying unit for reducing agent, it must therefore be ensured that the increase in volume does not destroy the conveying unit. In addition, a conveying unit should be ready to convey again as soon as possible after reducing agent contained in the conveying unit was frozen.

SUMMARY OF THE INVENTION

It is accordingly an object of the invention to provide a conveying unit for conveying reducing agent, which overcomes the hereinafore-mentioned disadvantages and solves or mitigates the highlighted technical problems of the heretofore-known units of this general type in a particularly advantageous manner. In particular, a conveying unit for reducing agent is to be proposed which is especially reliable and cost-effective and in which the conveying unit is freeze-proof in particular.

With the foregoing and other objects in view there is provided, in accordance with the invention, a conveying unit for conveying reducing agent from a tank to an exhaust gas treatment device for cleaning the exhaust gases from an internal combustion engine. The conveying unit comprises:

a flange delimited at least by a first side and a second side, in which the first side and the second side are disposed so as to be mutually opposite, at least in part;

at least one of the following components disposed on the first side:
   a filter,
   a biased ice pressure compensator or compensation device, and
   a flexible ice pressure compensator or compensation device; and at least one of the following components disposed on the second side:
   a pump,
   a pressure sensor, and
   a temperature sensor.

The conveying unit is, in particular, a conveying unit which is disposed externally from or outside of a reducing agent tank and the reducing agent is drawn from the tank through an intake pipe. In particular, the conveying unit is not disposed in a tank or directly on a tank. There is preferably a distance of at least 20 cm (centimeters), preferably even at least 50 cm and particularly preferably at least 1 m (meter) between the conveying unit and the reducing agent tank. This distance is bridged by the intake pipe. The pressure of the reducing agent is then increased to a defined pressure in the conveying unit. The pressurized reducing agent can be conveyed from the conveying unit to an injector through an injector pipe. The injector can be adapted to supply the reducing agent to an exhaust gas treatment device.

There is preferably an intake fitting and an outlet fitting on the conveying unit. The intake pipe can be connected to the intake fitting. The injector pipe is adapted for connection to the outlet fitting. A conveyance path can be provided in the conveying unit between the intake fitting and the outlet fitting. The reducing agent is conveyed along this conveyance path from the intake fitting to the outlet fitting and, in the process, passes (preferably all of) the above-mentioned individual components. The configuration of the conveyance path and the individually recited components together define a volume filled with reducing agent in the conveying unit.

The central element of the conveying unit is the flange. "A flange" is understood to mean, in particular, a plate-like formation. The flange is preferably made of metal, is particularly preferably made of aluminum and exhibits high thermal conductivity. Heat in the conveying unit or flange can thus be quickly distributed and the conveying unit can thus be heated particularly effectively. Reducing agent ducts which interconnect the individual components of the conveying unit are preferably provided in the flange. For example, ducts which connect a filter to a pump and the pump to a pressure sensor may be provided in the flange. These ducts form the conveyance path through the conveying unit, at least in part.

The individual components which may be disposed on the flange in the conveying unit according to the invention will each be described hereinafter.

A reducing agent filter is provided in order to retain contaminants in the reducing agent. Contaminants may cause damage in further components of the conveying unit and in the injector for supplying reducing agent to an exhaust gas treatment device. A filter is therefore disposed in the conveying unit, preferably directly after an intake fitting. Furthermore (additionally or alternatively) a screen may be provided within an intake fitting and/or within an outlet fitting, with which at least one component of the conveying unit and/or following the conveying unit (i.e. the injector) is protected against (rough) contaminations. Therefore, maintenance intervals for these components can be extended and/or the risk of clogging of the injector can be reduced.

Due to the risk of freezing, it is preferable to provide various compensators or compensation devices in the conveying unit to compensate for expansion of the reducing agent during freezing by increasing the volume of the conveying unit filled with reducing agent. Ice pressure compensation elements of this type are constructed, for example, as resilient elements which can enlarge regions of the conveying unit filled with reducing agent when freezing occurs. A distinction is made between biased ice pressure compensators or compensation devices and flexible ice pressure compensators or compensation devices. Biased ice pressure compensators or compensation devices only make it possible to enlarge the volume in the conveying unit when a specific threshold pressure is exceeded. Ice pressure compensators or compensation devices of this type may be constructed, for example, as sliding elements which are biased against a stop by a spring. Flexible ice pressure compensators or compensation devices enlarge the interior of the conveying unit filled with reducing agent when the pressure in the interior increases continuously. Flexible ice pressure compensators or compensation devices of this type may be constructed, for example, as rubber inserts in the pipes of the conveying unit.

A pump is used for increasing pressure and for conveying in the conveying unit. A piston pump or diaphragm pump is preferably used, which is basically distinguished in that it includes a pump chamber which regularly increases and decreases when reducing agent is conveyed. At least one inlet valve and at least one outlet valve are preferably disposed on the pump chamber. The conveying direction of the pump is determined by the configuration of the valves. The reducing agent can (only) flow into the pump chamber through the inlet valve. The reducing agent can (only) flow out of the pump chamber through the outlet valve.

A pressure sensor is preferably provided in the conveying unit as a further component. The conveying pressure generated by the pump can be monitored by a pressure sensor. The pump may be adjusted in such a way that the pressure measured by the pressure sensor reaches a specific value. The pressure sensor is preferably disposed after or downstream of the pump in a conveying direction along a conveyance path. The pressure generated by the pump can thus be monitored by the pressure sensor.

A temperature sensor may be provided as a further component. For example, a temperature sensor can monitor whether the reducing agent in the conveying unit is liquid or frozen. Heating of the conveying unit can thus be adjusted. The temperature sensor preferably determines the temperature of a region of the flange so that conclusions about the temperature of the reducing agent and/or the components may be drawn.

A filter is typically provided first along a conveyance path from an intake fitting of the conveying unit to an outlet fitting of the conveying unit. The pump follows next. The pressure sensor and optionally the temperature sensor are preferably disposed after or downstream of the pump in the conveyance path. The biased ice pressure compensator or compensation device and the flexible ice pressure compensator or compensation device are each preferably disposed at the point where the ice pressure produced during freezing of reducing agent in the conveying unit is particularly high. Furthermore, an advantageous configuration of the pump and the components of the conveying unit is to be realized along the conveyance path, so that air bubbles in the reducing agent can be shrunken easily, can be gathered at predetermined places and/or can be conveyed out of the conveying unit. Thus, it is preferred, that the conveyance path from the pump to the outlet fitting is provided substantially straight (in particular aligned) and/or that the conveyance path is provided vertically upwards (against gravity) in the mounted state.

In the conveying unit according to the invention, the configuration of the components on the first side and on the second side of the flange is preferably divided in such a way that the components without electrical fittings are disposed on the first side, while the components with electrical fittings are disposed on the second side. The components with electrical fittings are, for example, the pump and the sensors. These components cooperate, for example, with a control device of the conveying unit. Therefore, it is not necessary for electrical lines or signal lines to extend through the flange and/or around the flange.

The conveying unit according to the invention preferably includes no return pipe from the conveying unit back to the reducing agent tank.

In accordance with another particularly advantageous feature of the invention, the conveying unit includes a filter constructed as a removable filter cartridge including at least one of the following features:

at least a snap closure which can lock the filter cartridge to the conveying unit, at least an opening which can be closed by a closure and through which the filter cartridge can be emptied without being removed from the conveying unit, or at least a flexible ice pressure compensator or compensation device.

The filter cartridge preferably includes all of the above-mentioned features.

The filter is the component of the conveying unit which has to be most frequently serviced or replaced since this is where contaminants in the reducing agent collect. A snap closure for locking a filter cartridge to the conveying unit is therefore particularly advantageous. A snap closure can be quickly opened and closed. Reducing agent can be removed from the filter cartridge through an opening with a closure before the entire filter cartridge is removed from the conveying unit. Reducing agent can thus be prevented from escaping uncontrollably from the conveying unit when the filter cartridge is removed. The filter cartridge may be formed as a disposable component which is thrown away when the filter is no longer functional. The filter cartridge is generally fixed indirectly to the flange. A filter holder or else a cartridge holder can be fixed to the flange and the filter cartridge can be locked in the holder through the snap closure as described.

In accordance with a further advantageous feature of the invention, the conveying unit includes a filter through which a conveyance path extends, and at least one bypass duct for bypassing the filter being closed by an air-permeable diaphragm.

This concept can also be applied independently of the other features of the present invention. In particular, a conveying unit for conveying a reducing agent from a tank to an exhaust gas treatment device for cleaning the exhaust gases from an internal combustion engine is also proposed, wherein the conveying unit includes a conveyance path from an intake fitting to an outlet fitting which extends through a filter, and at least one bypass duct for bypassing the filter is provided and is closed by an air-permeable diaphragm.

It has proven to be problematic if air bubbles collect in the filter during operation. An air bubble of that type often cannot be drawn in by a pump due to the geometry of the filter, and instead remains in front of the filter. A relatively large space which ensures that the reducing agent is distributed over the entire filter area of the filter is generally disposed in front of the filter. A defined bypass duct for bypassing the filter makes it possible to ensure that an air bubble of that type does not remain in front of the filter, but is conveyed from the filter or a space surrounding the filter. The diaphragm prevents the reducing agent from flowing through the bypass duct and thus prevents unfiltered reducing agent from reaching further components of the conveying unit. An air-bypass duct of this type may be a constituent of a replaceable filter cartridge. However, a bypass duct of this type may also be produced in a filter holder.

At least one bypass duct is preferably disposed above the filter. This can be ensured by a suitable configuration of the conveying unit and a corresponding assembly of the conveying unit. The air bubbles typically collect at the highest point of the space in front of the filter. It is therefore particularly advantageous to provide the bypass duct precisely there.

Furthermore, a bleeder screw or an equivalent ventilation device can be provided, with which the conveyance path in the conveying unit can be (at least partially) vented, in particular the ventilation device is placed next to the filter. In this way it can be ensured that in the case of performing maintenance or the exchange of the filter, reducing agent keeps on flowing (i.e. from the tank), when the conveying unit is opened.

In accordance with an added advantageous feature of the invention, the conveying unit includes at least a biased ice pressure compensator or compensation device containing a movable element which is biased against a stop by a spring-loaded element, with the movable element being sealed by a V-ring seal. A V-ring seal is V-shaped and typically includes two flanks positioned at an angle to one another. The angle becomes more acute when the flanks are pressed together. The angle increases when the flanks are relieved of pressure. A particularly good (axial) seal between movable elements can be achieved with a V-ring seal of this type since the flanks of the V-ring seal can follow the movement of the movable element, at least in part.

In accordance with an additional advantageous feature of the invention, the conveying unit includes a pressure sensor and a pump, wherein the pressure sensor is disposed after or downstream of the pump along a conveyance path through the conveying unit and a flexible ice pressure compensator or compensation device is disposed on the pressure sensor at a first distance of less than 20 mm, preferably less than 10 mm and particularly preferably in a range between 2 mm [millimeters] and 6 mm from the pressure sensor.

This concept can also be applied independently of the other features of the present invention. In particular, a conveying unit for conveying reducing agent from a tank to an exhaust gas treatment device for cleaning the exhaust gases from an internal combustion engine is therefore also proposed, wherein the conveying unit includes a pressure sensor and a pump, the pressure sensor is disposed after or downstream of the pump along a conveyance path through the conveying unit and a flexible ice pressure compensator or compensation device is disposed on the pressure sensor at a first distance of less than 20 mm [millimeters].

This flexible ice pressure compensator or compensation device has a volume preferably of less than 500 mm$^3$, particularly preferably less than 200 mm$^3$ and in particular less than 100 mm$^3$ at ambient pressure.

In order to achieve a high precision of metering by the conveying unit, it is generally advantageous if merely biased ice pressure compensators or compensation devices are provided after or downstream of the pump along a conveyance path through the conveying unit. With biased ice pressure compensators or compensation devices, the volume filled with reducing agent in the conveying unit does not change with pressure variations within the normal operating pressure range. Thus, preferably the volume is very small (almost 0 mm$^3$) at usual working pressure and at usual working temperature. Due to this bias the ice pressure compensator or compensation device does not move during usual operation, so that friction and wear can be avoided. This is advantageous for metering precision. This is not the case with flexible ice pressure compensators or compensation devices, which change the volume filled with reducing agent in the conveying unit even in the case of pressure variations within the normal operating pressure range. However, it has been found that the pressure sensor is particularly sensitive to ice pressure. It is therefore advantageous to provide a flexible ice pressure compensator or compensation device at a very short distance from the pressure sensor. It is particularly advantageous if no further flexible ice pressure compensators or compensation devices are provided in addition to this one (individual) flexible ice pressure compensator or compensation device after or downstream of a pump along the conveyance path.

In accordance with a concomitant particularly advantageous feature of the invention, the conveying unit includes a pressure sensor disposed on a spur duct, which branches from a conveyance path through the conveying unit, and the flexible ice pressure compensator or compensation device extends into the spur duct. A configuration of this type makes it possible to place the flexible ice pressure compensator or compensation device particularly close to the pressure sensor. A biased ice pressure compensator or compensation device is also preferably provided in the vicinity of the pressure sensor. This device can also be constructed as a diaphragm which is biased against a stop by a resilient element. It is particularly advantageous if this diaphragm is made of rubber, plastics material or natural rubber. A diaphragm of this type may be very thin so that the compressibility of the diaphragm can be disregarded. However, an extension which forms the flexible ice pressure compensator or compensation device may be integrally molded or cast locally on this diaphragm. The extension preferably is formed of the same material as the diaphragm. However, it is also possible for the extension to be a separate component and/or be made of a different material.

In a further advantageous development, the conveying unit according to the invention includes a heater which extends into a filter of the conveying unit. A heater of this type can be operated with the cooling water of an internal combustion engine or with electric energy. A heater of this type is preferably a constituent of a filter holder for a filter cartridge. This heater is preferably the only heater in the conveying unit according to the invention. A heat-conducting structure can be provided between the heater and the flange, through which structure heat emitted by the heater can be introduced into the flange and/or from which the heat can be distributed to the individual components of the conveying unit.

Other features which are considered as characteristic for the invention are set forth in the appended claims, noting that the features recited individually in the claims can be combined in any technologically feasible manner and can be supplemented by explanatory facts from the description, with further variants of the invention being illustrated.

Although the invention is illustrated and described herein as embodied in a conveying unit for conveying reducing agent, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
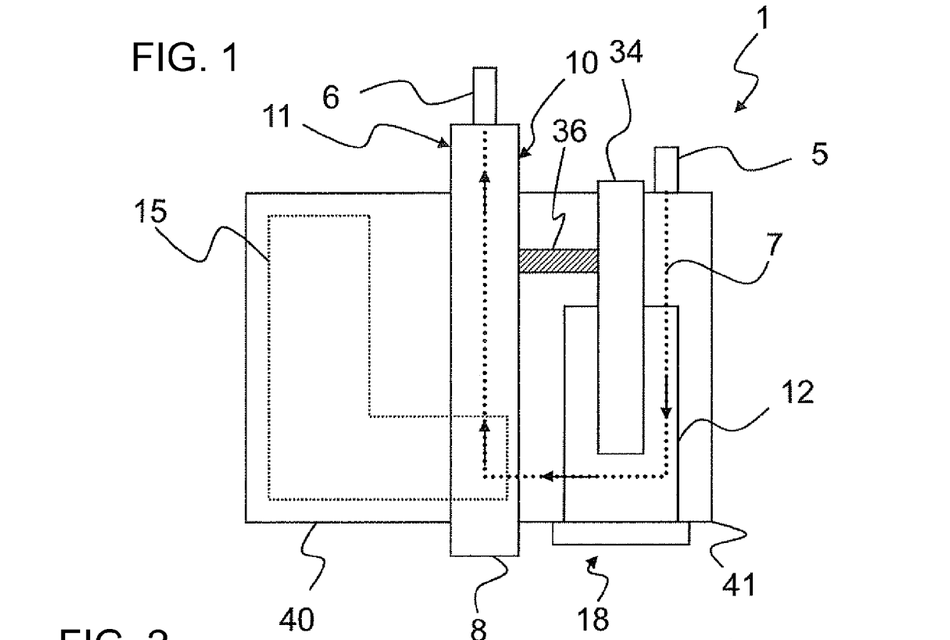
FIG. 1 is a diagrammatic, vertical-sectional view of a first variant of a conveying unit.
Figure 2:
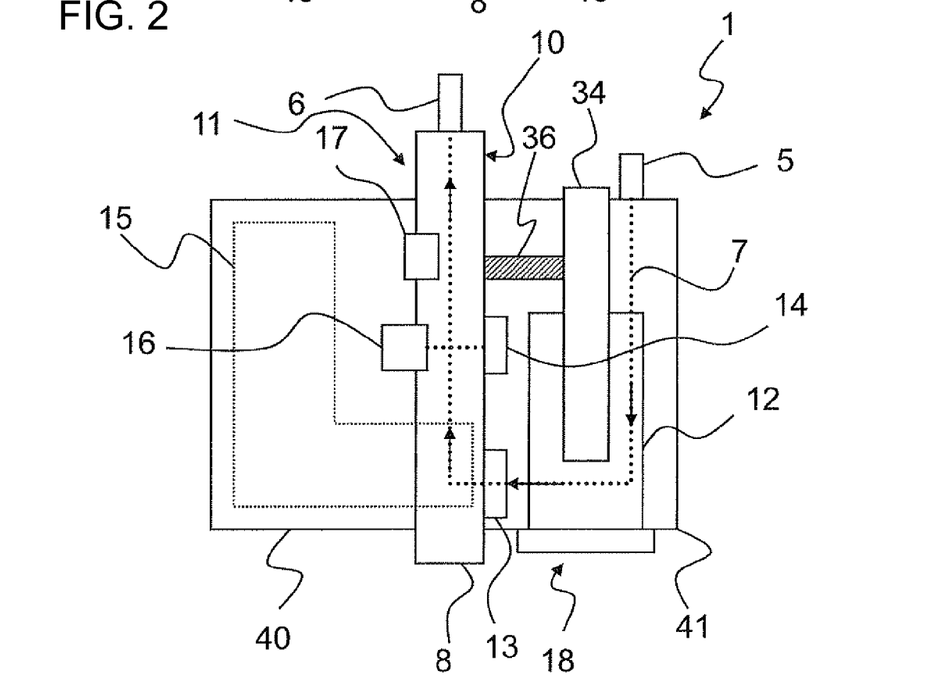
FIG. 2 is a vertical-sectional view of a second variant of the conveying unit.

Referring now in detail to the figures of the drawing for explaining the invention and the technical field in more detail by showing particularly preferred structural variants to which the invention is not restricted and in which dimensions are merely diagrammatically indicated, and first, particularly, to FIGS. 1 and 2 thereof, there is seen in each figure a conveying unit 1 which includes a flange 8 with a filter 12 provided on a first side 10 of the flange and a pump 15 provided on a second side 11 of the flange. A conveyance path 7 extends through the conveying unit 1 from an intake fitting 5 to an outlet fitting 6. The filter 12 is preferably disposed in a removable filter cartridge 18. The pump 15 is disposed in a pump head 40. The pump 15 conveys reducing agent along the conveyance path 7. The filter cartridge 18 with the filter 12 is inserted into a filter holder 41, which is attached to the flange 8 on the first side 10. The filter 12 is thus indirectly fixed to the first side 10 through the filter holder 41 and the filter cartridge 18. A (electric) heater 34 extends into the filter 12. A heat-conducting structure 36 extends from the heater 34 to the flange 8.

The variant embodiment illustrated in FIG. 2 basically corresponds to the features of the variant embodiment illustrated in FIG. 1. In FIG. 2, at least a biased ice pressure compensator or compensation device 13 and a flexible ice pressure compensator or compensation device 14 are provided on the first side 10 as additional components. A pressure sensor 16 and a temperature sensor 17 are provided on the second side 11. The pressure sensor 16 and the temperature sensor 17 are preferably disposed on the second side 11 in such a way that they are covered by the pump head 40. An entire electronic system, which is required to evaluate the signals from the pressure sensor 16 and from the temperature sensor 17 and to control the pump 15, can thus be protected by the pump head 40. The pump head 40 is preferably shell-shaped and includes an opening which is placed against the flange 8. A seal is provided between the pump head 40 and the flange 8 so the opening in the pump head 40 can be closed tightly by the flange 8.

Figure 3:
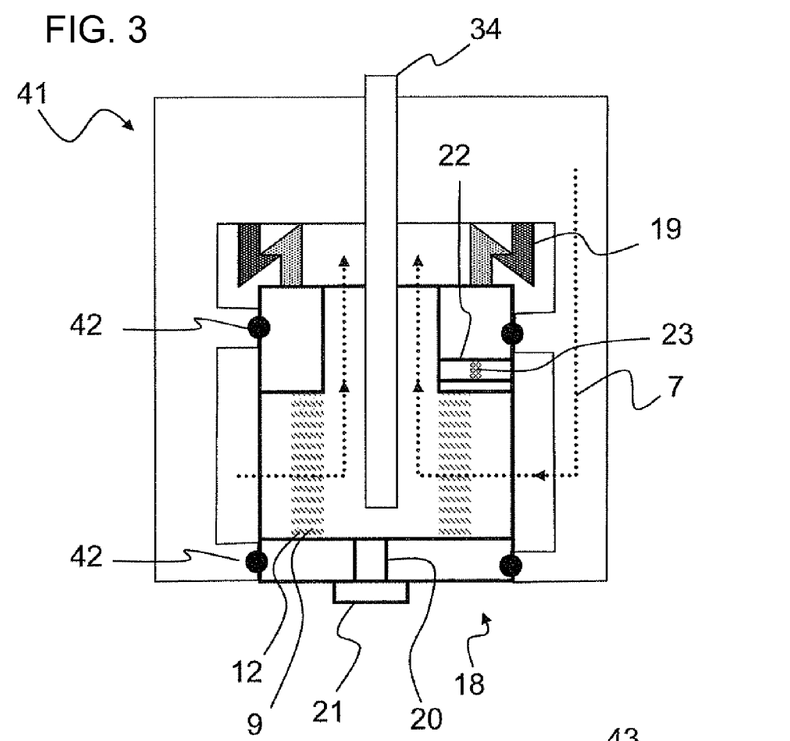
FIG. 3 is a vertical-sectional view of a filter holder for a conveying unit.

FIG. 3 shows a filter holder 41 for a conveying unit. A filter cartridge 18 is inserted into the filter holder 41 with the aid of a snap closure 19. The filter 12, which in this instance is constructed as a hollow cylinder made of a filter material, is disposed in the filter cartridge 18. The filter cartridge 18 is preferably inserted into the filter holder 41 with the aid of filter seals 42 in such a way that reducing agent flowing along the conveyance path 7 cannot flow around the filter 12 and no reducing agent escapes from the conveying unit 1. The filter seals 42 may be O-ring seals or V-ring seals. A bypass duct 22 for air is also provided in the filter cartridge 18 and is closed by a permeable diaphragm 23. The air filter may be surrounded by the bypass duct 22. A heater 34 extends into the filter 12. The heater 34 is preferably a constituent of the filter holder 41. An opening 20 in the filter cartridge 18 can be closed by a closure 21 so that the filter cartridge 18 can be emptied through the opening without being removed from the conveying unit 1.

Figure 4:
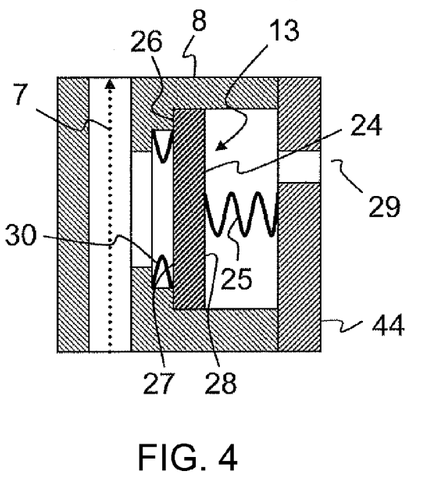
FIG. 4 is a vertical-sectional view of a first variant of a biased ice pressure compensation element.
Figure 5:
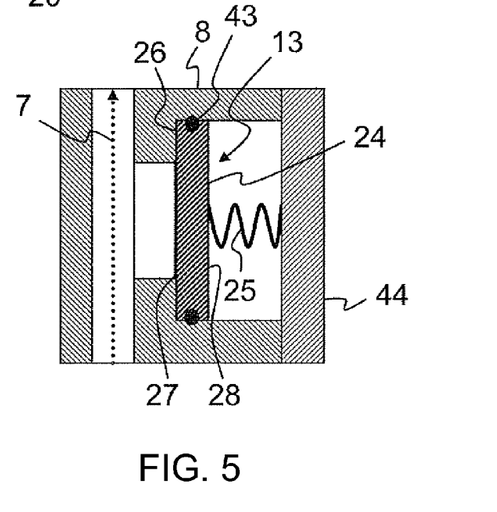
FIG. 5 is a vertical-sectional view of a second variant of a biased ice pressure compensation element.

FIGS. 4 and 5 each show a biased ice pressure compensator or compensation device 13 constructed with a movable element 24 which is biased against a stop 26 by a spring-loaded element 25. The movable element 24 is sealed from the flange 8 with the aid of a seal. In FIG. 4 this seal is a V-ring seal 30. In FIG. 5 this seal is an O-ring seal 43. A V-ring seal 30 has the advantage that it deforms when the movable element 24 moves. Linear contact is thus produced in each case between the V-ring seal 30 and the flange 8, and between the V-ring seal 30 and the movable element 24. The position of this linear contact does not change when the movable element 24 moves since the V-ring seal 30 can deform in order to compensate for the movement of the movable element 24.

By contrast, the O-ring seal 43 according to FIG. 5 moves relative to the flange 8 when the movable element 24 moves, in such a way that the O-ring seal 43 slides over a surface of the flange 8. This may impair the sealing effect in the variant embodiment according to FIG. 5. It is therefore advantageous to also provide V-ring seals 30 at suitable locations, in particular for seals on movable elements.

As an additional feature, the compensator or compensation device according to FIG. 4 includes an opening in a holding structure 44 for the spring-loaded element 25. The opening directly connects an outer face 28 of the movable element 24 to the environment 29. Pressure in a chamber between the outer face 28 and the holding structure 44 can thus be prevented from changing the action of the spring-loaded element 25. As a result of different ambient temperatures, a pressure could otherwise build up between the movable element 24 and the holding structure 44, which would interfere with and distort the action of the spring-loaded element 25.

Figure 6:
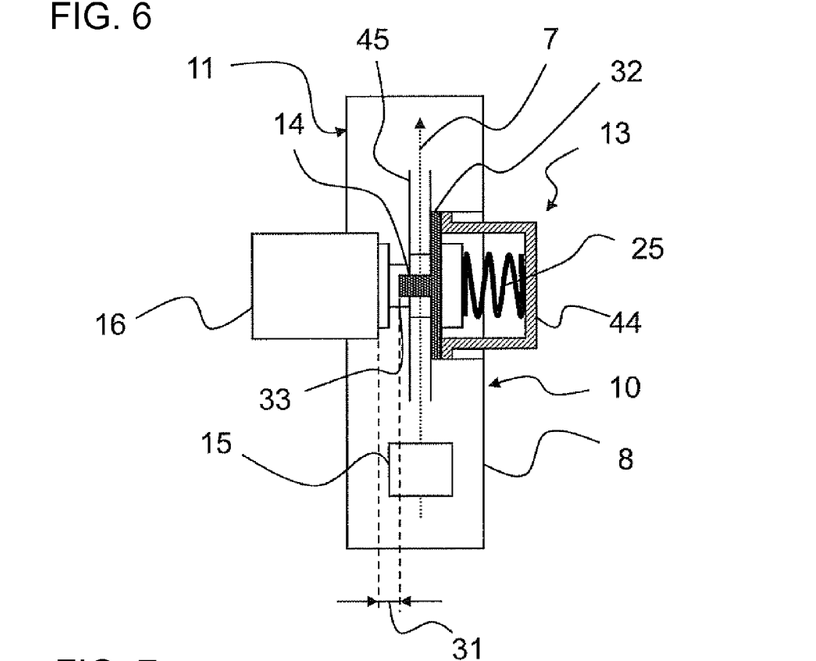
FIG. 6 is a vertical-sectional view of a portion of a flange of a conveying unit.

FIG. 6 shows an enlarged view of a flange 8 of a conveying unit 1. A conveyance path 7 extends through the flange 8 in a duct 45. A pressure sensor 16 is provided on the second side 11 of the flange 8. A biased ice pressure compensator or compensation element 13 is disposed on the first side 10 of the flange 8 opposite the pressure sensor 16. The biased ice pressure compensator or compensation element 13 is constructed with a first diaphragm 32, which is biased against a stop by a spring-loaded element 25 and a holding structure 44. An integrally molded or cast extension is disposed on the first diaphragm 32 and forms a flexible ice pressure compensator or compensation element 14. This flexible ice pressure compensator or compensation element 14 extends into a spur duct 33 which branches from the duct 45 or the conveyance path 7 and leads to the pressure sensor 16. In accordance with FIG. 6, the flexible ice pressure compensator or compensation element 14 is disposed at a very short distance 31 from the pressure sensor 16. In accordance with FIG. 6, the entire device is disposed after or downstream of a pump 15 along the conveyance path 7.

Figure 7:
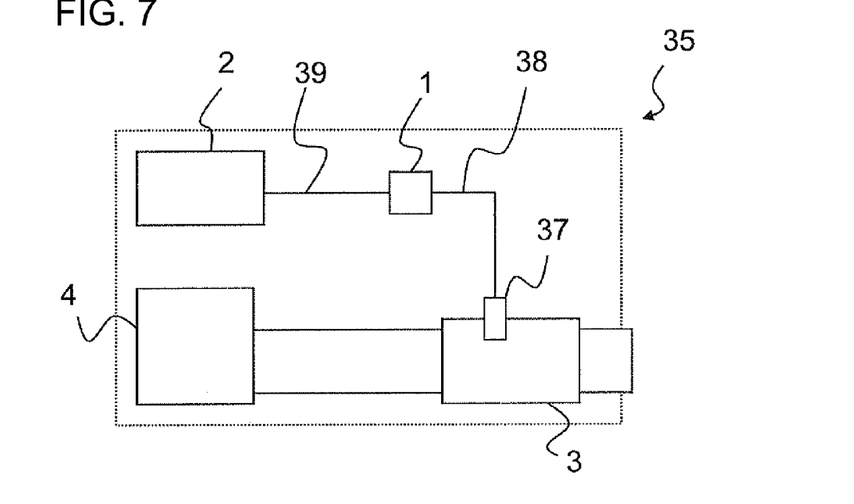
FIG. 7 is a block diagram of a motor vehicle including a conveying unit.

FIG. 7 shows a motor vehicle 35 including an internal combustion engine 4 and an exhaust gas treatment device 3 for cleaning exhaust gases from the internal combustion engine 4. The motor vehicle 35 includes a tank 2 for storing reducing agent, in particular an aqueous urea solution. Reducing agent can be conveyed through an intake pipe 39 from the tank 2 to the conveying unit 1, and from there through an injector pipe 38 to an injector 37. The injector 37 supplies reducing agent to the exhaust gas treatment device 3.

Figure 8:
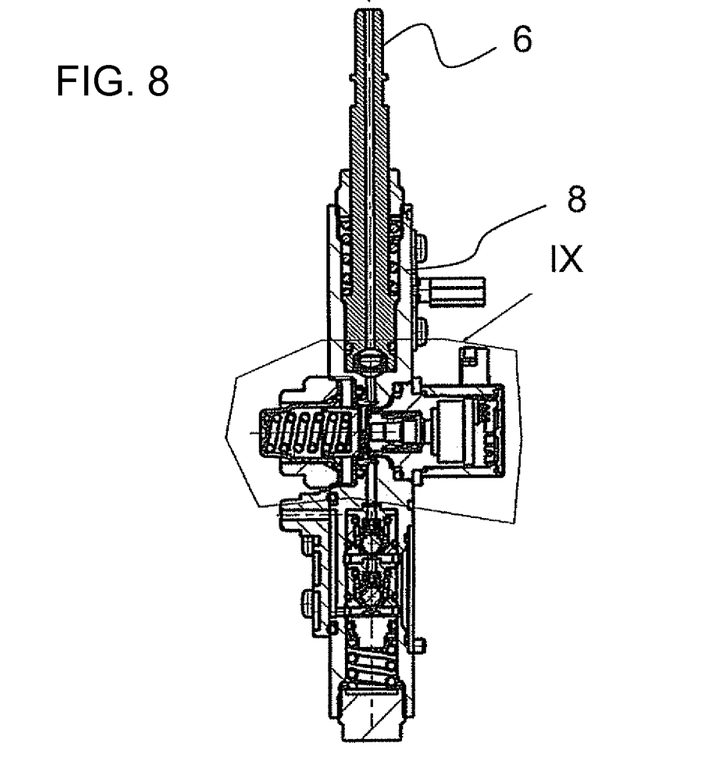
FIG. 8 is a longitudinal-sectional view of a conveying unit.

FIG. 8 shows a flange 8 for a conveying unit according to the invention with some accessories. For example, the outlet fitting 6 can be seen.

Figure 9:
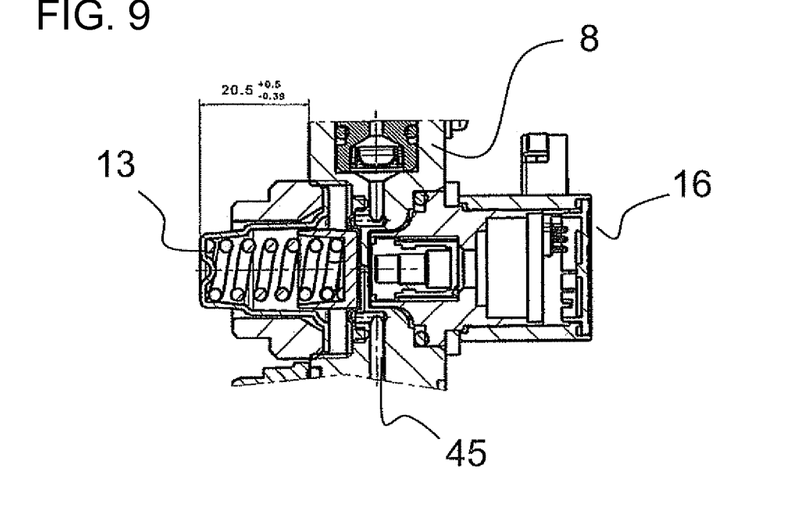
FIG. 9 is an enlarged sectional view of a portion IX of FIG. 8.

FIG. 9 shows a portion of FIG. 8 which is designated by reference numeral IX. In this case a duct 45 can be seen, through which the conveyance path 7 of the conveying unit 1 extends. A pressure sensor 16 is disposed on the duct 45. A biased ice pressure compensator or compensation device 13 is disposed opposite the pressure sensor 16. FIG. 9 basically shows the technical configuration as described with reference to FIG. 6.

Figure 10:
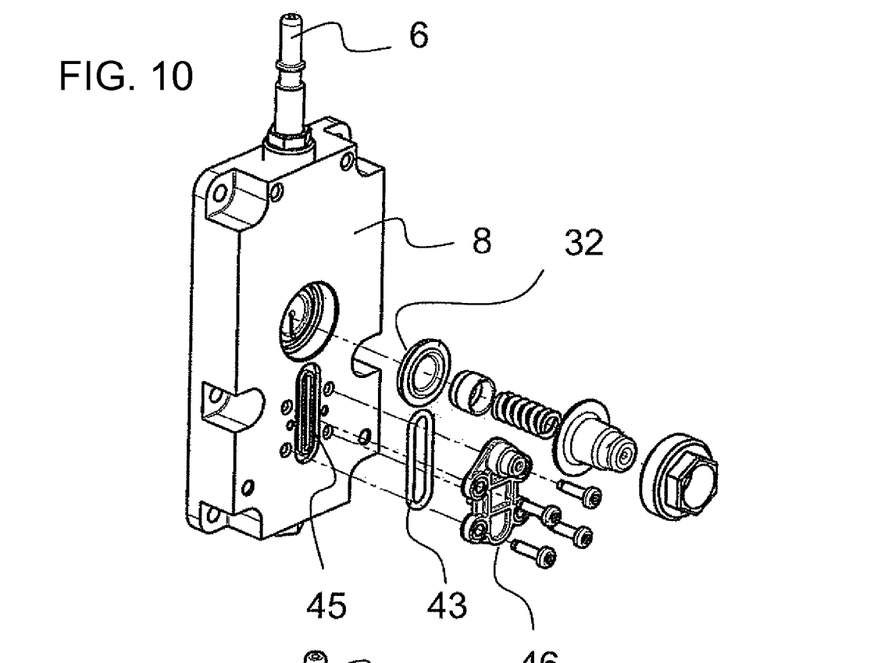
FIG. 10 is a first exploded, perspective view of FIG. 8.

FIG. 10 is an exploded view of the flange 8 according to FIG. 8. It can be seen how the biased ice pressure compensator or compensation device 13 is mounted on the flange 8 through the first diaphragm 32. The outlet fitting 6 is also shown in FIG. 10 for orientation purposes. In FIG. 10, it can also be seen that a duct 45 in the flange 8 may also be located on the surface of the flange 8, with the duct being closable by an accessory 46 which is sealed against the flange 8 by an O-ring seal 43.

Figure 11:
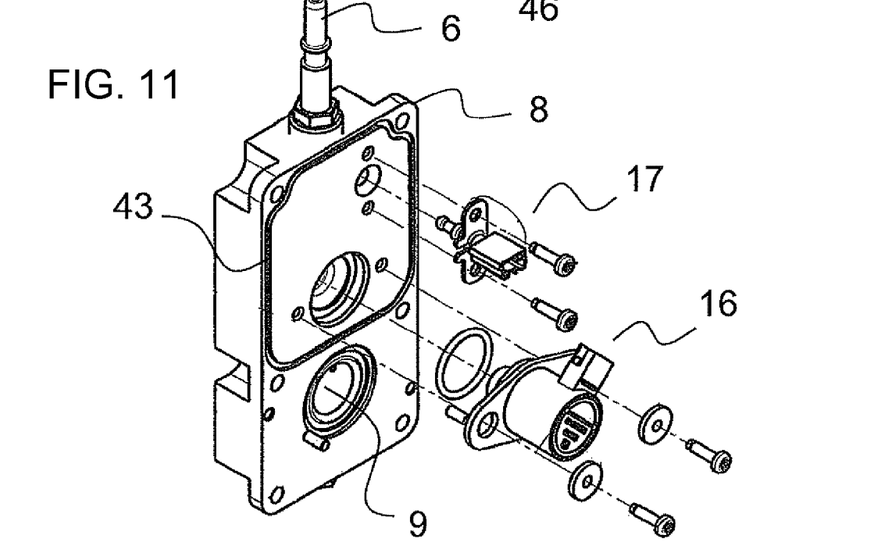
FIG. 11 is a second exploded, perspective view of FIG. 8.

In FIG. 11 it is possible to see how a temperature sensor 17 and a pressure sensor 16 are attached to the flange 8. An O-ring seal 43 is additionally provided on the flange 8, surrounds the temperature sensor 17 and the pressure sensor 16, and can be used to form a splash-proof seal between the flange 8 and a cover. This cover may be formed by a pump head (which is not shown). A pump chamber 9 can also be seen in FIG. 11. The pump chamber 9 is a constituent of the flange 8. A diaphragm (which is not shown) can be placed over the pump chamber 9. This diaphragm can be moved by a drive (which is also not shown) in order to convey reducing agent. The drive is preferably disposed in the pump head (which is not shown).

Figure 12:
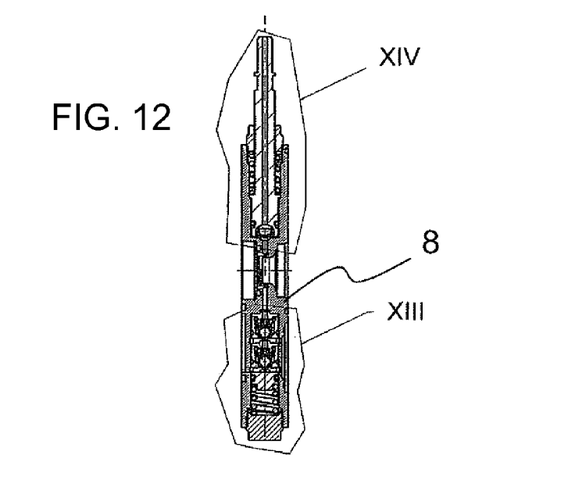
FIG. 12 is a further longitudinal-sectional view of a conveying unit.

FIG. 12 is a further sectional view through a conveying unit 1 with a flange 8. Portions XIII and XIV indicated therein are illustrated on an enlarged scale in FIGS. 13 and 14.

Figure 13:
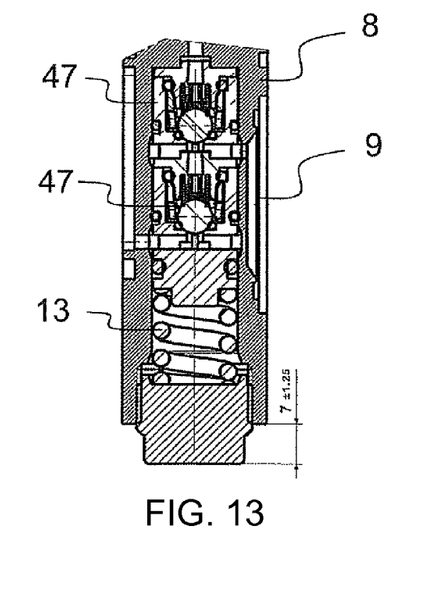
FIG. 13 is an enlarged sectional view of a portion XIII of FIG. 12.
Figure 14:
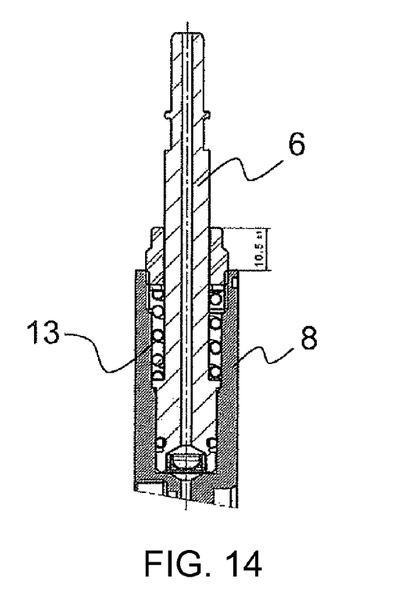
FIG. 14 is an enlarged sectional view of a portion XIV of FIG. 12.

FIGS. 13 and 14 each show a portion of FIG. 12. Valves 47 of a pump of the conveying unit which are inserted into the flange 8 through a passage can be seen in FIG. 13. The valves 47 are biased in the passage by a resilient element constructed as a spring. The valves 47 are thus movable when the pressure in the conveying unit exceeds a threshold pressure. A biased ice pressure compensator or compensation element 13 is thus formed. The valves 47 communicate with the pump chamber 9 through a duct.

FIG. 14 illustrates the outlet fitting 6, which is also fixed by a resilient element constructed as a spring in a passage in the flange 8. The outlet fitting 6 is thus also movable when the pressure in the conveying unit 1 exceeds a threshold pressure. A biased ice pressure compensator or compensation element 13 is thus also formed on the outlet fitting 6.

Figure 15:
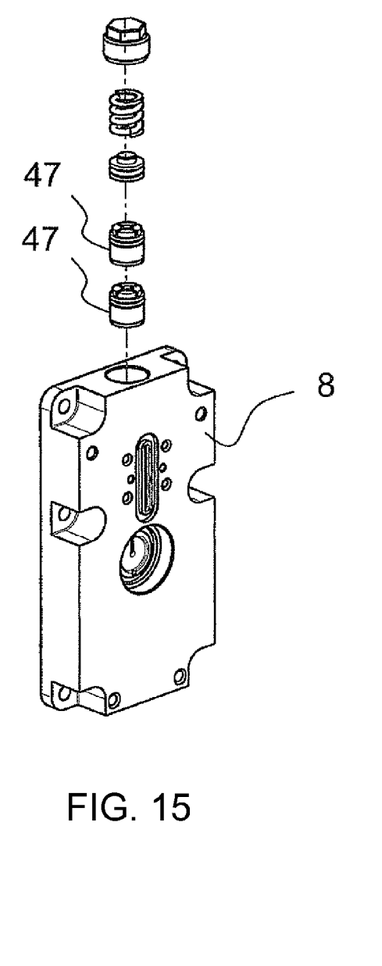
FIG. 15 is a first exploded, perspective view of FIG. 12.
Figure 16:
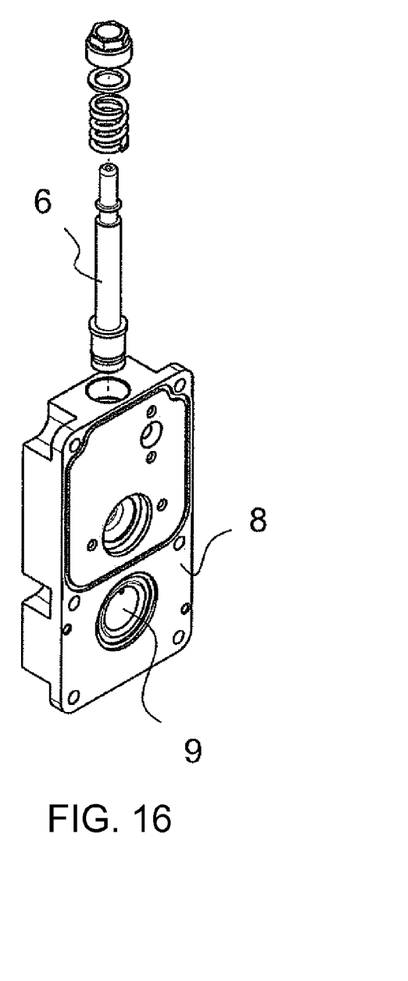
FIG. 16 is a second exploded, perspective view of FIG. 12.

FIGS. 15 and 16 are respective exploded views, showing how the valves 47 or the outlet fitting 6 are inserted into the flange 8. The pump chamber 9 formed at the flange 8 can also be seen.

In summary, the above description therefore relates to a conveying unit for conveying reducing agent from a tank to an exhaust gas treatment device for cleaning the exhaust gases from an internal combustion engine, wherein the conveying unit includes a flange defined at least by a first side and by a second side. The first side and the second side are disposed so as to be mutually opposed, at least in part. At least a filter, a biased ice pressure compensator or compensation device and/or a flexible ice pressure compensator or compensation device is/are disposed on the first side. At least a pump, a pressure sensor and/or a temperature sensor is/are disposed on the second side.

The invention claimed is:

1. A conveying unit for conveying reducing agent from a tank to an exhaust gas treatment device for cleaning exhaust gases from an internal combustion engine, the conveying unit comprising:
    a flange defined at least by first and second at least partly mutually oppositely disposed sides;
    a filter disposed on said first side, said filter having a removable filter cartridge including at least one of:
        at least one snap closure configured for locking said filter cartridge to the conveying unit,
        at least one opening configured for emptying said filter cartridge without removing said filter cartridge from the conveying unit and configured for being closed by a closure, or
        a flexible ice pressure compensator; and
    at least one component disposed on said second side and selected from the group consisting of:
        a pump,
        a pressure sensor, and
        a temperature sensor.

2. The conveying unit according to claim 1, further comprising a biased ice pressure compensator disposed on said first side, said biased ice pressure compensator containing a movable element, a stop, a spring-loaded element biasing said movable element against said stop, and a V-ring seal sealing said movable element.

3. A conveying unit for conveying reducing agent from a tank to an exhaust gas treatment device for cleaning exhaust gases from an internal combustion engine, the conveying unit comprising:
    a flange defined at least by first and second at least partly mutually oppositely disposed sides;
    a filter disposed on said first side,
    a conveyance path extending through said filter;
    at least one bypass duct configured for bypassing said filter; and
    an air-permeable diaphragm configured for closing said at least one bypass duct; and at least one component disposed on said second side and selected from the group consisting of:
a pump,
a pressure sensor, and
a temperature sensor.

4. A conveying unit for conveying reducing agent from a tank to an exhaust gas treatment device for cleaning exhaust gases from an internal combustion engine, the conveying unit comprising:
a flange defined at least by first and second at least partly mutually oppositely disposed sides;
a flexible ice pressure compensator device disposed on said first side;
a pressure sensor and a pump disposed on said second side;
a conveyance path through the conveying unit, said pressure sensor being disposed downstream of said pump along said conveyance path; and
said flexible ice pressure compensator disposed on said pressure sensor at a first distance of less than 20 mm [millimeters] from said pressure sensor;
a spur duct branching from said conveyance path;
said pressure sensor being disposed on said spur duct; and
said flexible ice pressure compensator extending into said spur duct.

* * * * *